United States Patent
Tom et al.

(10) Patent No.: US 7,512,743 B2
(45) Date of Patent: Mar. 31, 2009

(54) USING SHARED MEMORY WITH AN EXECUTE-IN-PLACE PROCESSOR AND A CO-PROCESSOR

(75) Inventors: Joe Y. Tom, Foster City, CA (US); Venkat Natarajan, Cupertino, CA (US)

(73) Assignee: Spansion LLC, Sunnyvale, CA (US)

( * ) Notice: Subject to any disclaimer, the term of this patent is extended or adjusted under 35 U.S.C. 154(b) by 344 days.

(21) Appl. No.: 11/557,439

(22) Filed: Nov. 7, 2006

(65) Prior Publication Data

US 2008/0126749 A1 May 29, 2008

(51) Int. Cl.
*G06F 12/00* (2006.01)
(52) U.S. Cl. .................. 711/146; 711/147; 711/158; 711/163
(58) Field of Classification Search ........... 711/146, 711/147, 158, 163
See application file for complete search history.

(56) References Cited

U.S. PATENT DOCUMENTS

| | | | |
|---|---|---|---|
| 6,145,069 A | 11/2000 | Dye | |
| 6,480,929 B1 | 11/2002 | Gauthier et al. | |
| 6,691,206 B1 | 2/2004 | Rubinstein | |
| 6,701,412 B1 * | 3/2004 | McDougall et al. | 711/118 |
| 7,318,126 B2 * | 1/2008 | Finkler | 711/144 |
| 2002/0016891 A1 | 2/2002 | Noel et al. | |
| 2006/0262608 A1 | 11/2006 | Babb et al. | |

OTHER PUBLICATIONS

International Search Report dated May 22, 2008 for PCT Application Serial No. PCT/US 07/83828, 2 Pages.

* cited by examiner

*Primary Examiner*—Stephen C Elmore
(74) *Attorney, Agent, or Firm*—Amin, Turocy & Calvin, LLP (57) ABSTRACT

The claimed subject matter provides systems and/or methods that facilitate sharing of a memory, having a single channel of access, between two or more processors. A host processor can be operatively connected to a co-processor and the memory in series. The host processor can execute in place to enable it to execute code directly from the memory, and can arbitrate access to the memory bus and thus the memory, so that the host processor can perform all memory fetches to the memory without interruption by the co-processor. The co-processor can be implemented as a finite state machine, and only accesses the memory during read or write cycles issued by the host processor. Various types of co-processors can be employed to perform various functions, such as cryptography and digital signal processing, for example. The memory can be volatile or non-volatile memory.

20 Claims, 7 Drawing Sheets

USING SHARED MEMORY WITH AN EXECUTE-IN-PLACE PROCESSOR AND A CO-PROCESSOR

TECHNICAL FIELD

The present invention relates generally to memory systems and in particular to systems and methods for managing access to a memory shared by a processor that executes in place and a co-processor.

BACKGROUND

With many electronic products, security of the data written to and read from memory is important. Examples of such products include portable devices such as cell phones, portable computers, voice recorders, and the like, as well as many larger electronic systems that are utilized in cars, planes, and industrial control systems. To improve security, a processor may be used to encrypt and decrypt data being transferred to and from memory. Typically, a host processor will have access to a memory channel, and the security processor will have access to a separate memory channel. However, for reasons of security, cost, and efficiency, it would be advantageous for the host processor and security processor to have access to the same memory channel.

Normally, where two or more processors share the same memory channel to a memory device, a bus arbiter is required to determine which processor will have access to the memory device at a particular time. However, some processors, such as a processor that eXecutes In Place (XIP), can place significant demands on memory access, as a processor that XIPs can process a significant number of memory reads (e.g., instructions, data), and writes associated with the host processor and must be able to access the memory any time it needs to execute such a memory read or write, or else it will crash. When a processor that XIPs is utilized in a multi-processor system where the processors all share a single channel to access a memory device, bus arbitration can become complicated, if not unworkable. Thus, where a host processor that XIPs and security processor share a single channel (bus) to access a memory device, it would be advantageous for the host processor to have access to the memory device any and every time it needs to execute a memory read or write associated with the host processor, while also allowing the security processor to access the memory device to read or write data from the memory device and perform its co-processing functions.

SUMMARY

The following presents a simplified summary of the innovation in order to provide a basic understanding of some aspects described herein. This summary is not an extensive overview of the claimed subject matter. It is intended to neither identify key or critical elements of the claimed subject matter nor delineate the scope of the subject innovation. Its sole purpose is to present some concepts of the claimed subject matter in a simplified form as a prelude to the more detailed description that is presented later.

The subject matter disclosed and claimed herein, in one aspect thereof, can comprise a host processor, which can be a processor that XIPs, that can be operatively coupled to a security processor and memory in a series connection so as to facilitate integrated security capabilities, for example. The memory can store software, such as security software, and data, such as secured data. The security processor, for example, can be positioned in series with the host processor and memory and can process security functions associated with secured data stored in the memory. At all times the host processor controls if and when the security processor can access the memory bus and thus the memory. The memory has only one channel (memory bus) of access, and the host processor and security processor share access to the memory. The memory can include a memory address for each element of memory therein, and can be partitioned so that each processor has a memory partition dedicated to that processor. The host processor and security processor each know to which memory partition a particular memory address corresponds. Further, the memory partitions can be dynamic, as the partitions can either be fixed or programmable at run time.

The claimed subject matter obviates the need for a separate bus arbiter by employing a master-slave relationship between the host processor and the security processor. The host processor can act like a "master," as it can issue instructions to the security processor ("slave"), which can be implemented as a finite state machine, so that the host processor can arbitrate when the security processor accesses the memory bus and thus the memory. This master-slave structure can thereby enable the host processor to XIP and have access to the memory any and every time necessary to execute its memory reads and writes associated with the host processor, while allowing the security processor to access the memory to write or read data associated with the security processor and perform its co-processing functions at certain times when the host processor desires, but also restricting the security processor from accessing the memory during any time cycles the host processor is accessing the memory bus. The host processor can XIP with regard to its memory reads or writes, and knows exactly how many time cycles the security processor needs to perform a given task, such as encryption or decryption. During certain time cycles where the host processor wants the security processor to perform a function, the host processor can generate a read cycle or write cycle, associated with the security processor, to a specific address of the memory, also associated with the security processor. The security processor can know which memory addresses are reserved for the security processor, and the security processor and memory can receive information regarding such read cycle or write cycle via a memory address line of the bus, for example, and the security processor knows that it can perform its co-processing security operations during such read or write cycles.

In accordance with another aspect of the claimed subject matter, the security processor can include a bypass mode, so that when the host processor is accessing the memory, the security processor is essentially transparent to the host processor and the memory as the host processor performs its memory reads and writes and executes with regard to instructions and data.

The following description and the annexed drawings set forth in detail certain illustrative aspects of the claimed subject matter. These aspects are indicative, however, of but a few of the various ways in which the principles of the innovation may be employed and the claimed subject matter is intended to include all such aspects and their equivalents. Other advantages and novel features of the claimed subject matter will become apparent from the following detailed description of the innovation when considered in conjunction with the drawings.

DETAILED DESCRIPTION

The claimed subject matter is described with reference to the drawings, wherein like reference numerals are used to refer to like elements throughout. In the following description, for purposes of explanation, numerous specific details are set forth in order to provide a thorough understanding of the subject innovation. It may be evident, however, that the claimed subject matter may be practiced without these specific details. In other instances, well-known structures and devices are shown in block diagram form in order to facilitate describing the subject innovation.

As utilized herein, terms "component," "system," "interface," and the like are intended to refer to a computer-related entity, either hardware, software (e.g., in execution), and/or firmware. For example, a component can be a process running on a processor, a processor, an object, an executable, a program, and/or a computer. By way of illustration, both an application running on a server and the server can be a component. One or more components can reside within a process and a component can be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of the claimed subject matter. Moreover, the word "exemplary" is used herein to mean serving as an example, instance, or illustration. Any aspect or design described herein as "exemplary" is not necessarily to be construed as preferred or advantageous over other aspects or designs.

Security of data can be important in network-based systems, such as when applications deal with sensitive information. It would be beneficial to have a processor dedicated to managing security functions, so as to free a host processor to perform its functions without interruptions associated with security functions. To optimize security, as well as for reasons of cost and efficiency, it would also be advantageous to implement such a multi-processor system by having the processors share access to a single channel (bus) to memory. Accordingly, the following claimed subject matter optimizes processor and memory utilization, and facilitates a heightened level of security in user applications.

The claimed subject matter enables shared access to a single channel (memory bus) to memory by more than one processor. The need for a separate bus arbiter is obviated by employing a master-slave relationship between a host processor running user applications, for example, and the security processor performing security functions associated with secured data. The host processor can act like the "master," as it can generate read cycles or write cycles, associated with the security processor, to the security processor ("slave"), which can be implemented as a finite state machine, so that the host processor can arbitrate when the security processor accesses the memory bus and thus the memory. This master-slave structure can thereby enable the host processor to execute in place and have access to the memory any and every time necessary to execute its memory reads or writes, so that the host processor does not crash. Further, such a structure allows the security processor to access the memory to write/read data associated with its security functions and perform its co-processing functions at times specified by the host processor when the host processor wants the security processor to perform some function, while restricting the security processor from accessing the memory during any time cycles the host processor is accessing the memory.

Figure 1:
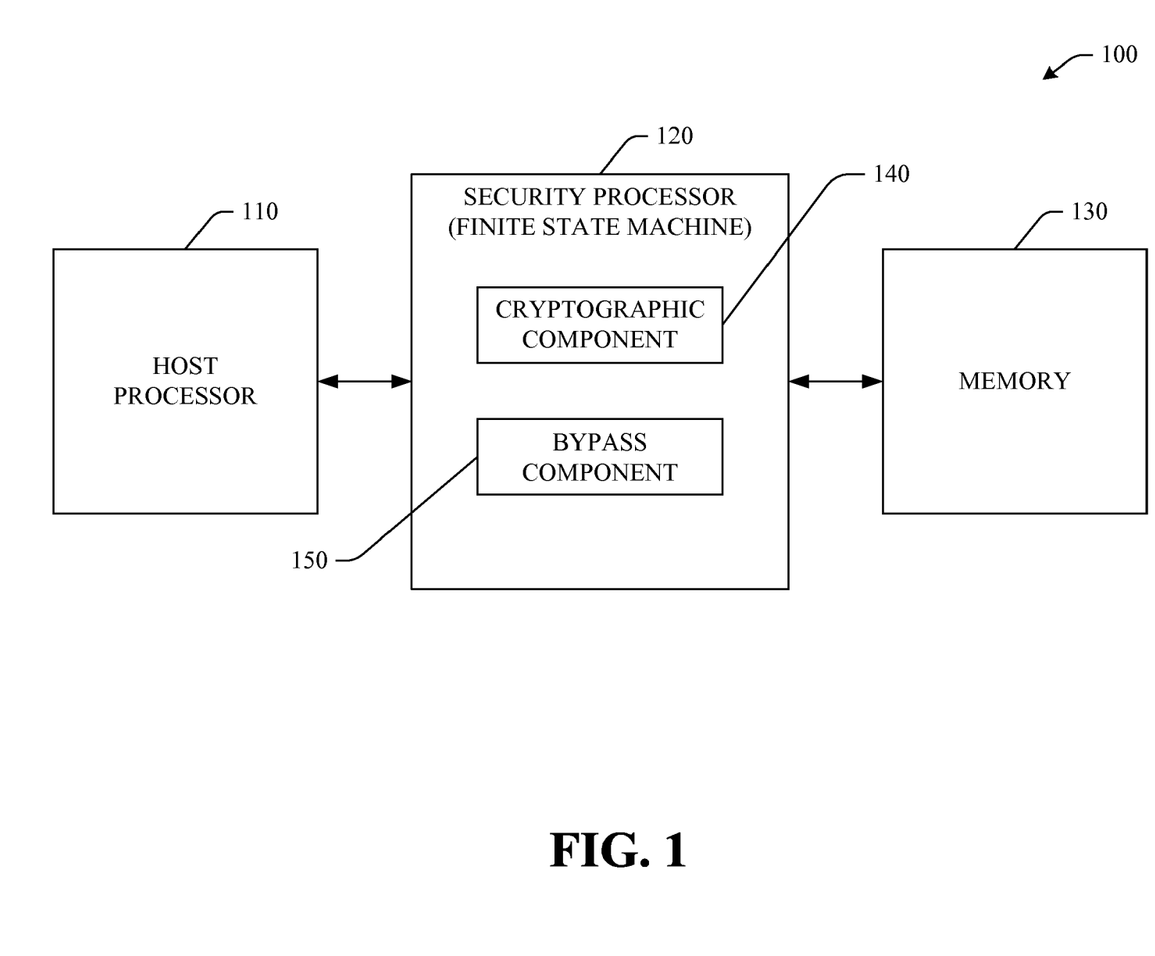
FIG. 1 illustrates a system that facilitates sharing memory, having a single access channel, by more than one processor in accordance with an aspect of the subject matter disclosed herein.

Now turning to FIG. 1, a system 100 that facilitates sharing memory, having a single access channel, by more than one processor is illustrated. The system 100 can include a host processor 110, which can be a typical applications processor that handles communications and runs applications. The host processor 110 can be a baseband processor for a mobile handset, personal data assistant (PDA), or the like. The host processor 110 can communicate, and be connected in series, with a security processor 120 positioned between the host processor 110 and the memory 130 via a split or shared bus to facilitate integrated security capabilities and efficiency.

The security processor 120 can include a cryptographic component 140 capable of performing cryptography processes to encrypt or decrypt data, for example, to provide security capabilities. The security processor 120 can further include a bypass component 150 that when selected or enabled allows data and other information to flow through it, so the host processor 110 can access the memory 130 directly without any processing or interference by the security processor 120. In the bypass mode, the security processor 120 is, in effect, "transparent" to the host processor 110 and memory 130, as the data and other information flows on the shared or split bus to/from the host processor 110, through a system bus (not shown) of the security processor 120, and from/to the memory 130. For example, the bypass component 150 can be selected or enabled to put the security processor 120 into bypass mode when the host processor 110 is performing memory reads (e.g., instruction fetch, data) or writes involving instructions and/or data or other information that are not secured, such as application programs, etc.

When the bypass component 150 is not selected or enabled, the security processor 120 can access the memory 130 via the split or shared bus. The host processor 110 can provide the signal timing to both the security processor 120 and memory 130. Thus, the host processor 110 can control when data is moved in/out of the memory from/to the security processor 120. An aspect of the claimed subject matter is that the host processor 110 can "move" data to and from the memory 130 without the host processor 110 actually making a copy of the memory data. This architecture can thereby enhance the security of the system as well as simplify the design of the interface.

The memory 130 can have a separate memory addresses to which data can be stored. The memory 130 can also be partitioned into two or more partitions, such that the host processor 110 can access the host partition (not shown) in the memory 130 and the memory addresses contained within that partition, and the security processor 120 can access the security processor partition (not shown) in the memory 130 and the memory addresses contained within that partition. The partitions can be dynamic, as the partitions can either be fixed or programmable at run time, and the host processor 110 and security processor 120 can each know what their respective partitions are as well as the respective memory addresses associated therewith. For example, the host processor 110 can access its respective memory partition (not shown) in the memory 130 via the memory bus, through the system bus (not shown) of the security processor, and can store data and other information in that partition. Further, the memory partition (not shown) dedicated to the security processor 120 can store secured data, and the security processor 120 can access the secured data via the memory bus.

It is to be appreciated that, while the system 100 is shown with only two processors, the host processor 110 and security processor 120, the system 100 can include more than two processors. Further, system 100 is shown with a security processor 110 handling security aspects of the system. However, the claimed subject matter is not so limited. The system is adaptable to meet a variety of processing needs and can include digital signal processors, Fast Fourier Transform (FFT) processors, Finite Impulse Response (FIR) Filter processors, image processors, data compression processors (e.g., mP3), and the like.

It is to be further appreciated that the memory 130 can include volatile memory (e.g, random access memory (RAM), static RAM (SRAM), and the like) and non-volatile memory (e.g., read only memory (ROM), programmable ROM (PROM), flash, and the like).

The host processor 110 can eXecute In Place (XIP) enabling the host processor 110 to execute code directly from the memory 130. Since the host processor 110 can XIP, it must have access to the memory 130 to perform memory reads or writes, otherwise the host processor 110 will crash. Further, the security processor 120 must be able to access the memory 130 to carry out its security processing functions. However, as stated, supra, to facilitate increased security and efficiency, the system 100 can be constructed so that the host processor 110 is in series with the security processor 120 and the memory 130, which has only one channel (memory bus) of access to it.

To permit both the host processor 110 and the security processor 120 to have access to the memory 130 via a single channel, the host processor 110 and security processor 120 can be implemented in a master-slave type relationship. The host processor 110 can be employed as the "master" and can control the security processor 120 ("slave"), which can be implemented as a finite state machine, for example. The timing for all operations can be derived from the host processor. As the host processor 110 XIPs, the host processor 110 will be performing memory reads or writes, in accordance with read or write cycles associated with, and generated by, the host processor 110, and executions associated with the functions of the host processor 110. At certain times specified by the host processor 100, when the host processor 110 wants the security processor 120 to perform some function(s), the host processor 110 can generate a write cycle or read cycle associated with the security processor 120 that will be sent to the security processor 120 and memory 130 to let the security processor 120 know that it can access the memory bus and thus the memory 130 to perform a task associated with its security processing functions. The read or write cycles associated with the security processor 120 can be asynchronous and generated as determined by the host processor 110. When a read cycle or write cycle associated with the security processor 120 is generated by the host processor 110, the bypass component 150 can be de-selected or disabled to take the security processor 120 out of its "transparent" bypass mode and allow the cryptographic component 140 as well as other processing components of the security processor 120 to access the memory 130 and perform read or write operations associated with its security processing operations. This architecture thereby obviates the need for a separate bus arbiter, as the host processor 110 arbitrates access to the memory bus. Accordingly, the host processor 110 and the security processor 120 coordinate read/write access to the memory 130 so as to optimize processor/memory utilization while ensuring a heightened level of security.

Figure 2:
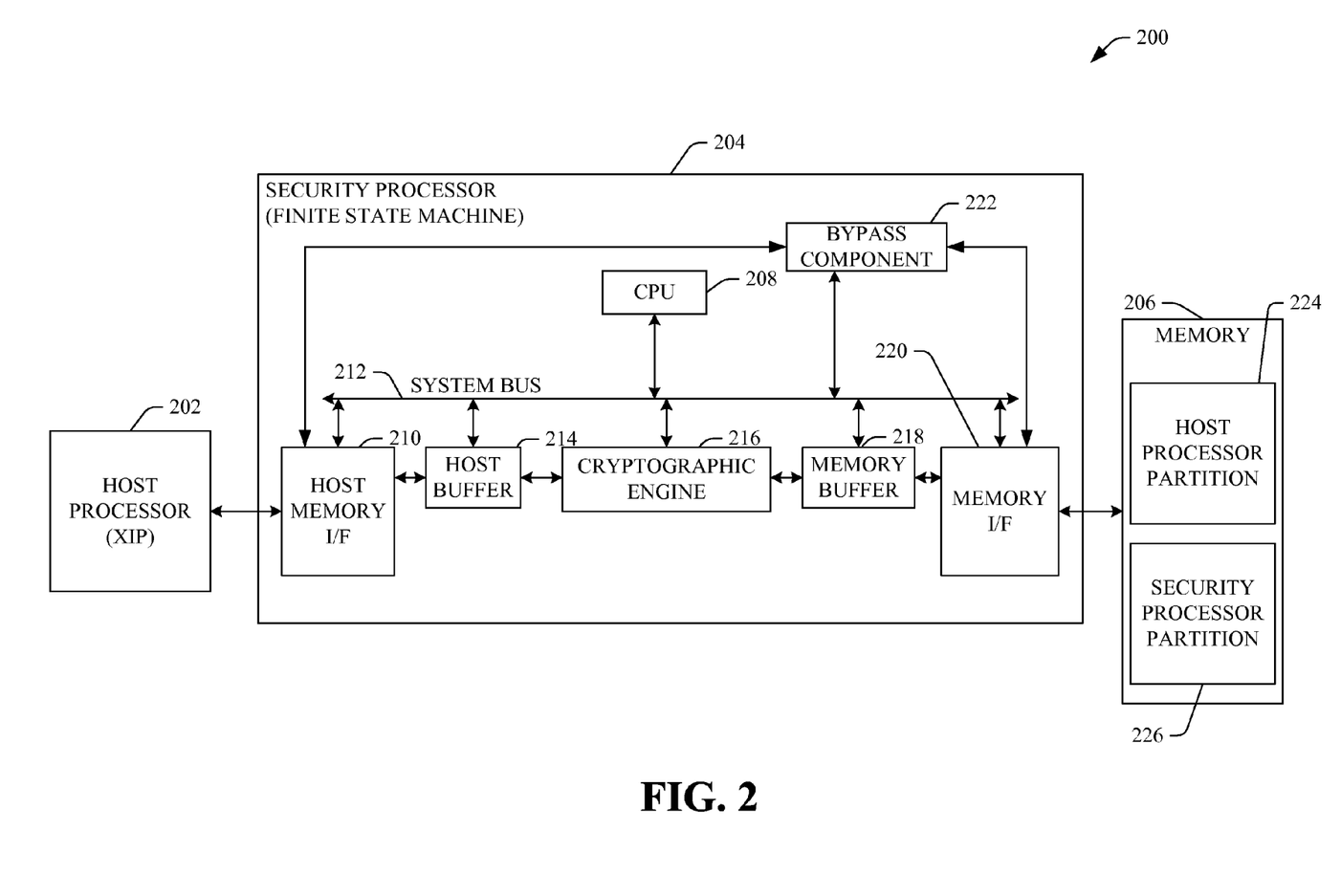
FIG. 2 illustrates a system that facilitates shared access to a single channel (memory bus) to memory by multiple processors in accordance with an aspect of the subject matter disclosed herein.

In more detail, FIG. 2 illustrates a system 200 comprising dual processors that share a single access channel (memory bus) to memory. The system 200 can include a host processor 202, which can be a typical applications processor that handles communications and runs applications. The host processor 202 can be a baseband processor for a mobile handset, personal data assistant (PDA), or the like. The host processor 202 can communicate, and can be connected in series, with a security processor 204 and memory 206 (e.g., volatile or non-volatile memory) via a shared or split memory bus, such that the security processor 204 is positioned in between the host processor 202 and memory 206 in the series connection.

The security processor 204 can include a central processing unit (CPU) 208 or any other type of low power application processor. The CPU 208 can provide a secure environment to implement authentication algorithms and security software. However, as described, infra, the timing associated with the reading or writing of data to the memory 206 by the security processor 204 can be derived from and controlled by the host processor 202. Generally, the CPU 208 can only have control over certain functions associated with the security processor 204 when the host processor 202 is not XIPing, but in any event, the security processor 204 cannot have access to the memory bus and thus the memory 206 unless it receives a read or write cycle associated with the security processor 204 that is generated by the host processor 202.

The security processor 204 can also include a host memory interface (I/F) 210 that can be associated with the system bus 212 and can handle all memory transactions with the host processor 202. Specifically, the host memory I/F 210 can manage signaling, thus complying with the interface definitions of the memory 206. The host memory I/F 210 also can manage interpreting or differentiating between a secure and non-secure request, and monitoring requests via enforcing access rights and permissions associated with the security processor 204.

The security processor 204 can include a host buffer 214 can be associated with the host memory I/F 210 and can hold data associated with secured transactions to and from the host processor 202. The host buffer 214 also can serve as a mailbox between the CPU 208 and the host processor 202, wherein interpretation of the messages is carried out by the CPU 208. The security processor 204 can further include a cryptographic engine 216 that can be associated with the host buffer 214 and system bus 212 and perform all the cryptographic algorithms, symmetric and a-symmetric, or the like, needed by the system 200. The cryptographic engine 216 can include one or more buffers (not shown) that can be utilized by the engine 216 when performing its operations. The CPU 208 can configure the cryptographic engine 216 and control data flow through the security processor 204. The CPU 208 can interface the system bus 212 and the security applications that run on the CPU 208, arbitrating with the host processor 202. The security processor 204 can also include a memory buffer 218 that can be associated with the system bus 212 and cryptographic engine 214, and can hold data associated with secured transactions as the data proceeds to and from the memory 206. Further, the security processor 204 can include a memory interface (I/F) 220 that can be associated with the system bus 212 and memory buffer 218, and can handle all transactions to and from the memory 206 and the security processor 204, such as signaling and interpretation.

The security processor 204 can further employ a bypass component 222 that can be associated with the system bus 212, host memory I/F 210, and memory I/F 220, and when selected or enabled can allow data and other information to flow through it via the system bus 212, so the host processor 202 can access the memory 206 directly without any processing or interference by the security processor 204. The bypass component 222 can be a co-processor, for example, such as a simple co-processor that is able to receive memory address data, and select or enable the bypass mode when the memory address in the read/write cycle is associated with the host processor 202, or de-select or disable the bypass mode when the memory address is associated with the security processor 204. In the bypass mode, the security processor 204 is essentially "transparent" to the host processor 202 and memory 206, as the data and other information flows via the shared or split bus to/from the host processor 202, through the security processor 204, via the system bus 212 and from/to the memory 206 via the memory bus. For example, the bypass component 222 can be selected or enabled to put the security processor 204 into bypass mode when the host processor 202 is performing memory reads or writes associated with the host processor 202 that involve instructions, or data or other information that are not secured, such as with regard to application programs, etc.

When the bypass component 222 is de-selected or not enabled, the security processor 204 can access the memory 206 via the shared memory bus. The host processor 202 still provides the signal timing to both the security processor 204 and memory 206 to control the security processor's 204 access to the memory bus, and thus the memory 206. Thus, the host processor 202 can control when data is moved in/out of the memory 206 from/to the security processor 204, as well as moved between internal components (e.g., cryptographic engine 216, memory buffer 218) of the security processor 204, as described, infra. An aspect of the claimed subject matter is that the host processor 202 can "move" data to and from the memory 206 without the host processor 202 actually making a copy of the memory data. This architecture can thereby enhance the security of the system as well as simplify the design of the interface.

The memory 206 can have separate memory addresses to which memory data can be stored. The memory 206 can also be partitioned into two or more partitions, such that the host processor 202 can access the host partition 224 in the memory 206 and the memory addresses (not shown) contained within that partition, and the security processor 204 can access the security processor partition 226 in the memory 206 and the memory addresses (not shown) contained within that partition. The partitions 224, 226 can be dynamic, and can be fixed or programmable at run time, and the host processor 202 and security processor 204 can each know what their respective partitions are as well as the respective memory addresses associated therewith. For example, the host processor 202 can access its respective memory partition 224 and can store data and other information associated with the host processor 202 in its partition 224. Further, the memory partition 226 dedicated to the security processor 204 can store security software and data, and the security processor 204 can access the security software and data, and can perform security functions based on the specific security software stored.

It is to be appreciated that, while the system 200 is shown with only two processors, the system 200 can include more than two processors. Further, system 200 is shown with a security processor 204 handling security aspects of the system. However, the claimed subject matter is not so limited. The system is adaptable to meet a variety of processing needs and can include digital signal processors, Fast Fourier Transform (FFT) processors, Finite Impulse Response (FIR) Filter processors, image processors, data compression processors (e.g., mP3), and the like.

It is to be further appreciated that the memory 206 can include volatile memory (e.g, random access memory (RAM), static RAM (SRAM), and the like) and non-volatile memory (e.g., read only memory (ROM), programmable ROM (PROM), flash, and the like).

The host processor 202 can eXecute In Place (XIP) enabling it to execute code directly from the memory 206. Since the host processor 202 can XIP, it must have access to the memory 206 to perform memory reads or writes associated with the host processor 202, otherwise the host processor 202 will crash. Further, the security processor 204 must be able to access the memory 206 to carry out its security processing functions. However, as stated, supra, to facilitate increased security and efficiency, the system 200 can be constructed so that the host processor 202 is in series with the security processor 204, positioned between the host processor 202 and the memory 206, which has only one channel (memory bus) of access to it.

To permit both the host processor 202 and the security processor 204 to have access to the memory 206 via a single channel (memory bus), the host processor 202 and security processor 204 can be implemented in a master-slave type relationship. The host processor 202 can be employed as the "master" and can control the security processor 204 ("slave"). Further, the security processor 204 can be implemented as a finite state machine, for example. As stated, supra, the timing for all operations can be derived from the host processor 202. As the host processor 202 XIPs, it will be performing memory reads or writes, in accordance with read or write cycles associated with, and generated by, the host processor 204, and executions, associated with its host processing functions. At certain times specified by the host processor 202 when the host processor 202 wants the security processor 204 to perform some function(s), the host processor 202 can generate a write cycle or read cycle associated with the security processor 204 that will be sent to the security processor 204 and memory 206 to let the security processor 204 know that it can access the memory 206 to perform a task associated with its security processing functions. When a read cycle or write cycle associated with the security processor 204 is generated by the host processor 202, the bypass component 222 can be de-selected or disabled to take the security processor 204 out of its "transparent" bypass mode and allows the cryptographic engine 216, as well as other processing components of the security processor 204, to access the memory 206 and perform read or write operations associated with its security processing operations. This architecture thereby obviates the need for a separate bus arbiter, as the host processor 202 arbitrates access to the memory bus. Accordingly, the host processor 202 and the security processor 204 coordinate read/write access to the memory 206 so as to optimize processor/memory utilization while ensuring a heightened level of security.

For example, the host processor 202 can XIP and perform memory reads or writes associated with its host processing duties by accessing the memory 206 via the single channel (memory bus) through the system bus 212. At this point, the security processor 204 will be "transparent" to the host processor 202 and memory 206, as the bypass component 222 will be selected or enabled. The bypass component can be selected or enabled when the security processor 204 sees that the current time cycle is a memory read or write associated with the host processor 202 as it XIPs. When the host processor 202 generates such a read or write cycle, the host processor 202 can also send control information and memory address information via a control line (not shown) and an address line (not shown), respectively, associated with the bus, to the security processor 204 and memory 206. For example, control information can include data associated with chip enable, write enable, address valid, data ready, data not ready, etc. Based on the particular memory address, the host processor 202 and security processor 204 will know whether that particular memory address is in the host processor partition 224 or security processor partition 226 of the memory 206. The security processor 204 can see that the current cycle involves a memory address associated with the host processor partition 224, and can therefore select or enable the bypass component 222, so that the security processor 204 can be in bypass mode and be "transparent" to the host processor 202 and memory 206, and can thereby allow the host processor 202 to access the memory 206 via the memory bus and the system bus 212 of the security processor 204.

At certain times (e.g., every 10 cycles, every 20 cycles, or a varying number of cycles), the host processor 202 can determine that it wants the security processor 204 to perform a function(s). At that point, the host processor 202 can generate a read cycle(s) or write cycle(s) associated with the security processor 204 to allow the security processor 204 to access the memory 206 via the single channel (memory bus). When generating the read cycle or write cycle associated with the security processor 204, the host processor 202 can also send control information and memory address information via a control line (not shown) and an address line (not shown), respectively, associated with the bus, to both the security processor 204 and memory 206. The security processor 204 can see that the memory address specified in the address line is a memory address located in the security processor partition 226 of the memory 206. The security processor 204 then knows to de-select or disable the bypass component 222, so that the security processor 204 can access the memory 206 via the single channel (memory bus) to the memory 206, and perform the appropriate security processing operation (e.g., read, write).

If the cycle generated is a read cycle associated with the security processor 204, for instance, the security processor 204 can access the memory 206 and read the data from the memory address (in the security processor partition 226) specified with the read command. The data read from the memory address can be transferred through the memory bus to the memory buffer 218 via the memory I/F 220 in the security processor 204. At the same time, the host buffer 214 can send data via the host memory I/F 210 through the bus, as split, between the host processor 202 and security processor 204. The data sent from the host buffer 214 to the host processor 202 can be "junk" data, or may be valid data with respect to the host processing function; the host processor 202 will know whether the data it is receiving is "junk" data or valid data, and will process such data accordingly. At the same time, data in the memory buffer 218 can be transferred or transmitted to the cryptographic engine 216 for processing. The cryptographic engine 216 can have a sufficient number of buffers to enable the engine 216 to handle its cryptography functions. Furthermore, at the same time, data at the end of the internal buffers (that is, data that is at the end of the processing by the engine 216) in the engine 216 can be transferred to transmitted to the host buffer 214, where the host buffer 214 has sent the data it was holding to the host processor 202, as previously stated. Thus, an efficient "pipeline" is employed to read the data from the flash memory 206, process it in the security processor 204, and transmit it to the host processor 202. For each read cycle associated with the security processor 204, data is moved to the next state in the process until it is ultimately sent to the host processor 202. If the cycle is not a read cycle associated with the security processor 204, such as when the host processor 202 performs a memory fetch associated with host processor 202, the security processor is in bypass mode and does not do any security processing, and it is transparent to the host processor 202 and memory 206. When the next read cycle associated with the security processor 204 is generated by the host processor 202, the components of the security processor 204 will perform an operation associated with the respective component (e.g., cryptographic engine 214 will perform a cryptography-related operation), and the data will move through the "pipeline" to the next state, and so on.

Similarly, when a write cycle associated with the security processor 204 is generated by the host processor 202, the security processor 204 will receive memory address information associated with the write cycle and will know that the memory address is located in the security processing partition 226 of the memory 206. The security processor 204 will get out of bypass mode by de-selecting or disabling the bypass component 222 and will process data through the "pipeline" which goes from the host processor 202 to the memory 206. That is, data in the memory buffer 218 will be sent through the memory I/F 220 to be written in the memory address corresponding with the write cycle. The cryptographic engine 216 will send data from its internal buffer to the memory buffer 218; the host buffer 214 will send data therein to the cryptographic engine 216; and the host processor 202 will send data through the bus, as split, from its internal buffer through the host memory I/F 210 to the host buffer 214.

It should be further appreciated that read cycles associated with the security processor 204 can be generated by the host processor 202 before all data associated with previously generated write cycles has been processed by the security processor 204, and vice versa. That is, the claimed subject matter can include sufficient buffers in its respective components to have a read "pipeline" flowing in one direction from memory 206 to host processor 202, and a write "pipeline" flowing from the host processor 202 to memory 206. For example, the host processor 202 can generate a write cycle associated with the security processor 204, and start a write "pipeline" from the host processor 202 through the security processor 204 to the memory 206. Before all data associated with that write have been completed, a read cycle associated with the security processor 204 can be generated by the host processor 202, and a read "pipeline" can be started utilizing other buffers in the host processor 202 and security processor 202, such that a component may have data associated with the write cycle in one buffer, and data associated with the read cycle in another buffer.

Figure 3:
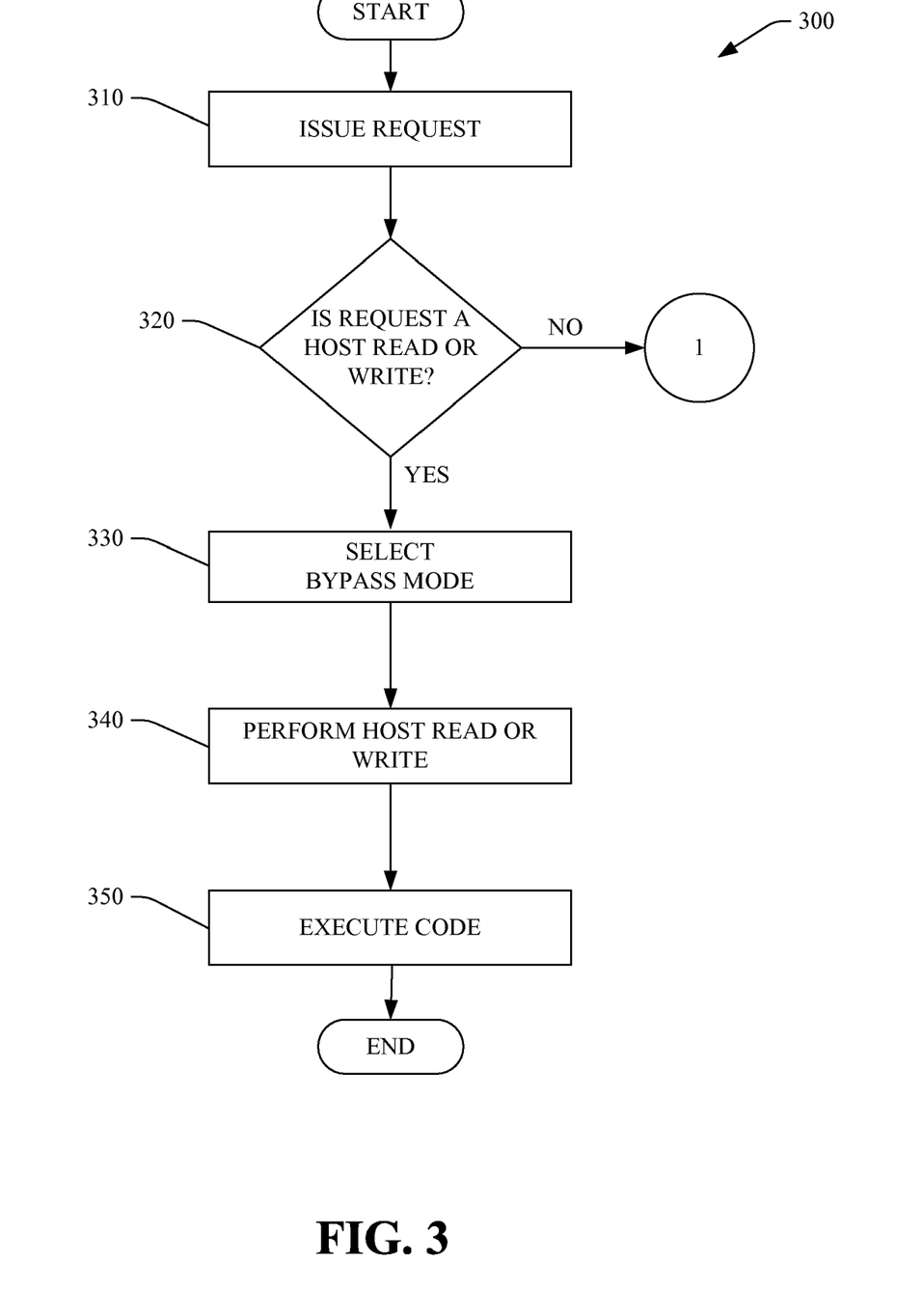
FIG. 3 illustrates performing a memory request in accordance with an aspect of the subject matter disclosed herein.
Figure 4:
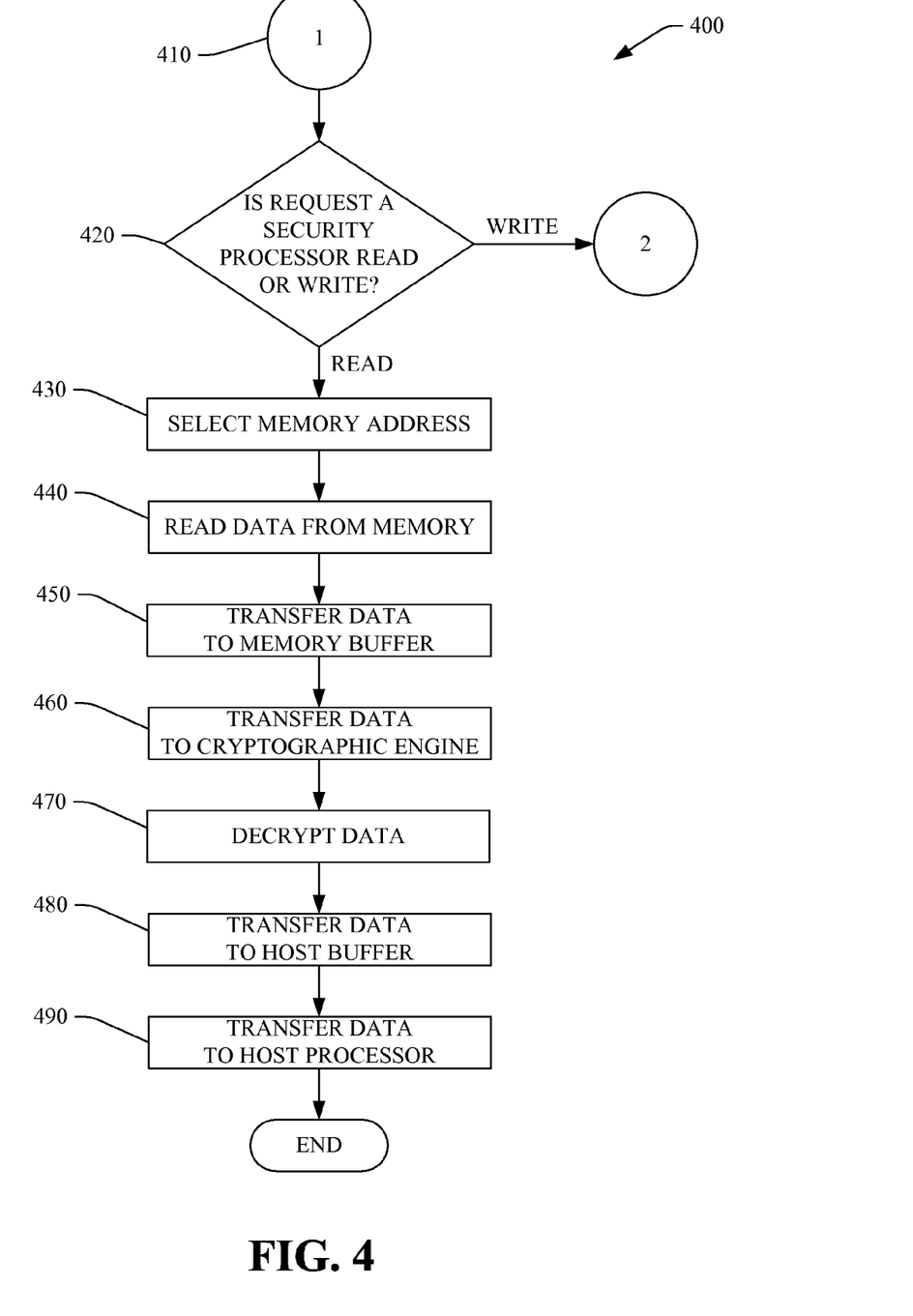
FIG. 4 illustrates an exemplary methodology that facilitates performing a read request in accordance with an aspect of the subject matter disclosed herein.
Figure 5:
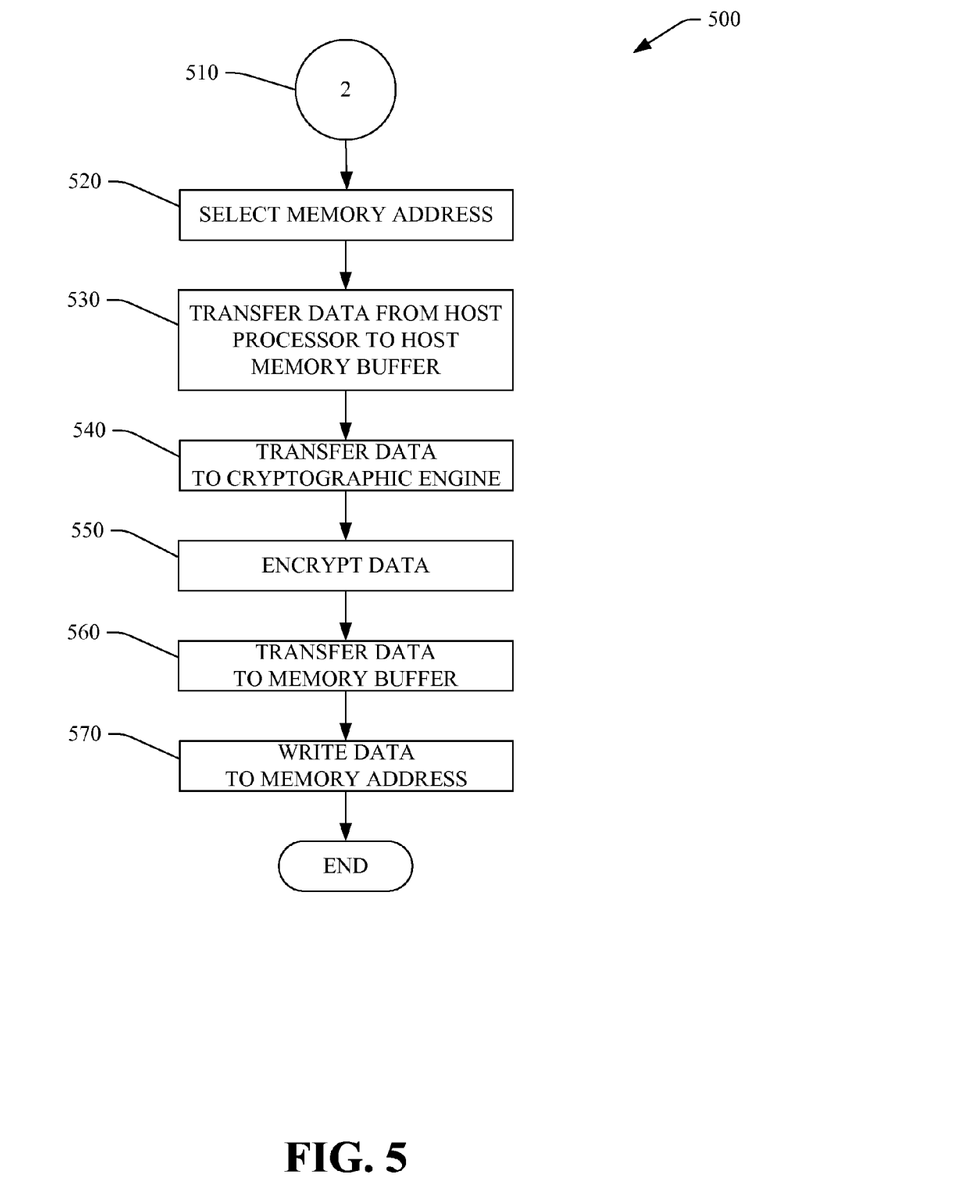
FIG. 5 illustrates an exemplary methodology that facilitates performing a write request in accordance with an aspect of the subject matter disclosed herein.

FIGS. 3-5 illustrate methodologies in accordance with the claimed subject matter. For simplicity of explanation, the methodologies are depicted and described as a series of acts. It is to be understood and appreciated that the subject innovation is not limited by the acts illustrated and/or by the order of acts, for example acts can occur in various orders and/or concurrently, and with other acts not presented and described herein. Furthermore, not all illustrated acts may be required to implement the methodologies in accordance with the claimed subject matter. In addition, those skilled in the art will understand and appreciate that the methodologies could alternatively be represented as a series of interrelated states via a state diagram or events. Additionally, it should be further appreciated that the methodologies disclosed hereinafter and throughout this specification are capable of being stored on an article of manufacture to facilitate transporting and transferring such methodologies to computers. The term article of manufacture, as used herein, is intended to encompass a computer program accessible from any computer-readable device, carrier, or media.

Referring now to FIG. 3, a methodology of performing a memory request by a host processor is illustrated. At 310, the host processor can generate a request. At 320, a determination is made as to whether the request is a memory read or write associated with the host processor. If the request is not a read or write associated with the host processor, then such a memory read or write is not performed and another course of action can be taken, as will be described, infra, at FIGS. 4 and 5, and the disclosure related thereto. If the request is a memory read/write associated with the host processor, then, at 330, the bypass component in the security processor can be selected or enabled, so that the security processor is essentially "transparent" to the host processor and memory, and the host processor can access the memory via the single memory channel (memory bus) connected to the memory through the system bus of the security processor. At 340, the read or write can be performed by accessing the memory address specified in the read or write. At 350, the host processor can execute code associated with the read or write received from the memory. The host processor can XIP with regard to code it reads from the memory, for example. At this point, the process ends.

Turning now to FIG. 4, a methodology of performing a read request for the security processor in accordance with the claimed subject matter is illustrated. At 410, a determination had been made at 320 in FIG. 3 that the request was not a read or write associated with the host processor. At 420, a determination is made as to whether the request is a read or write associated with the security processor. If the request is a write associated with the security processor, another course of action can be taken, as will be described, infra, at FIG. 5, and the disclosure related thereto. If the request is a read (e.g., a read cycle) associated with the security processor, then at 430, the memory address in the memory from where the read is to be performed is selected in accordance with the information specified in the read request. At this point, the bypass component in the security processor is de-selected or disabled, so that the security processor can access the memory (e.g., flash memory) via the single channel (memory bus) connected to the memory. At 440, the data stored in the memory address can be read from the memory. At 450, the data can be transferred to the memory buffer via the memory buffer I/F in the security processor. At 460, during the next read cycle associated with the security processor that is generated by the host processor, the data can be transferred from the memory buffer to the internal buffer(s) in the cryptographic engine within the security processor for further processing. At 470, during the next read cycle associated with the security processor that is generated by the host processor, the cryptographic engine can decrypt the data. At 480, during the next read cycle associated with the security processor, the decrypted data can be transferred to the host buffer in the security processor. At 490, during the next read cycle associated with the security processor, the decrypted data can be transferred to the host processor via the host buffer I/F and the bus connected to the host processor. At this point, the process ends.

FIG. 5 illustrates a methodology of performing a write request for the security processor in accordance with the claimed subject matter. At 510, a determination had been made at 420 in FIG. 4 that the request was a write request associated with the security processor. Further, at 410 of FIG. 4, a reference was made to the determination in FIG. 3, at 320, that the request was not a read or write associated with the host processor. At 520, the memory address in the memory (e.g., flash memory) from where the write is to be performed is selected in accordance with the information specified in the write request. At this point, the bypass component in the security processor is de-selected or disabled, so that the security processor can access the memory via the single channel (memory bus) connected to the memory. At 530, during the write cycle associated with the security processor that is generated by the host processor, the data stored in the internal buffer of the host processor can be transferred from the host processor to the host buffer in the security processor via the host buffer I/F connected to the bus. At 540, during the next write cycle associated with the security processor that is generated by the host processor, the data can be transferred from the host buffer to the internal buffer(s) in the cryptographic engine for further processing. At 550, during the next write cycle associated with the security processor, the cryptographic engine can encrypt the data. At 560, during the next write cycle associated with the security processor, the encrypted data can be transferred from the cryptographic engine to the memory buffer. At 570, during the next write cycle associated with the security processor, the encrypted data can be transferred from the memory buffer via the memory buffer I/F connected to the single channel (memory bus) and written to and stored in the memory at the specified memory address. At this point, the process ends.

It is to be appreciated that the above methodologies have been described with each component (e.g., cryptographic engine) having only one buffer. However, the claimed subject matter is not so limited. Each component claimed herein can include sufficient buffers to permit the processing of data and other information in accordance with the claimed subject matter. Further, while the above has been described as including a security processor, it is to be appreciated that the claimed subject matter is not so limited, and another type of processor (e.g., FFT, FIR filter, DSP, ...) can be utilized in conjunction with the host processor.

Further, it is to be appreciated that the memory can include volatile memory (e.g, random access memory (RAM), static RAM (SRAM), and the like) and non-volatile memory (e.g., read only memory (ROM), programmable ROM (PROM), flash, and the like).

Figure 6:
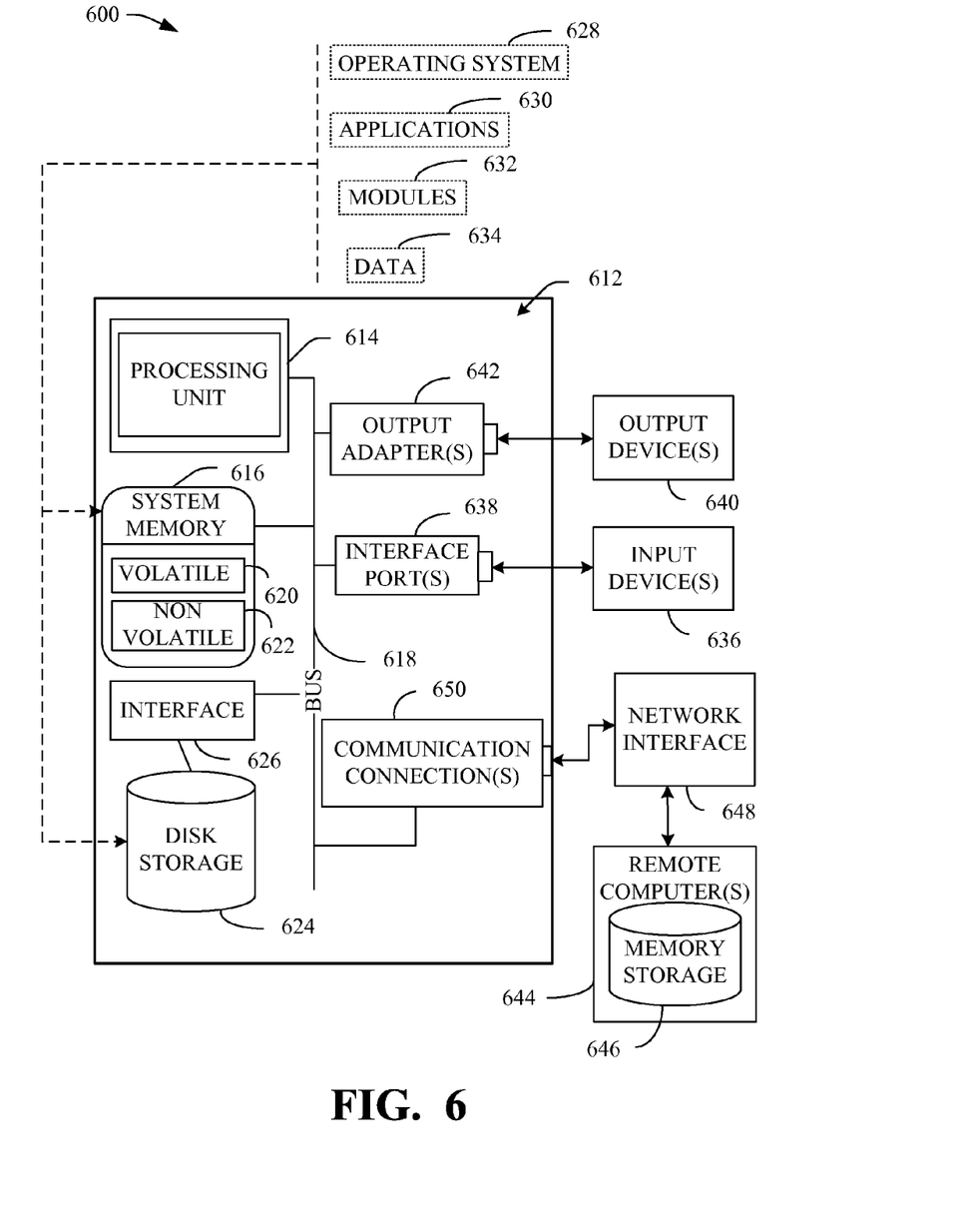
FIG. 6 is a schematic block diagram illustrating a suitable operating environment.
Figure 7:
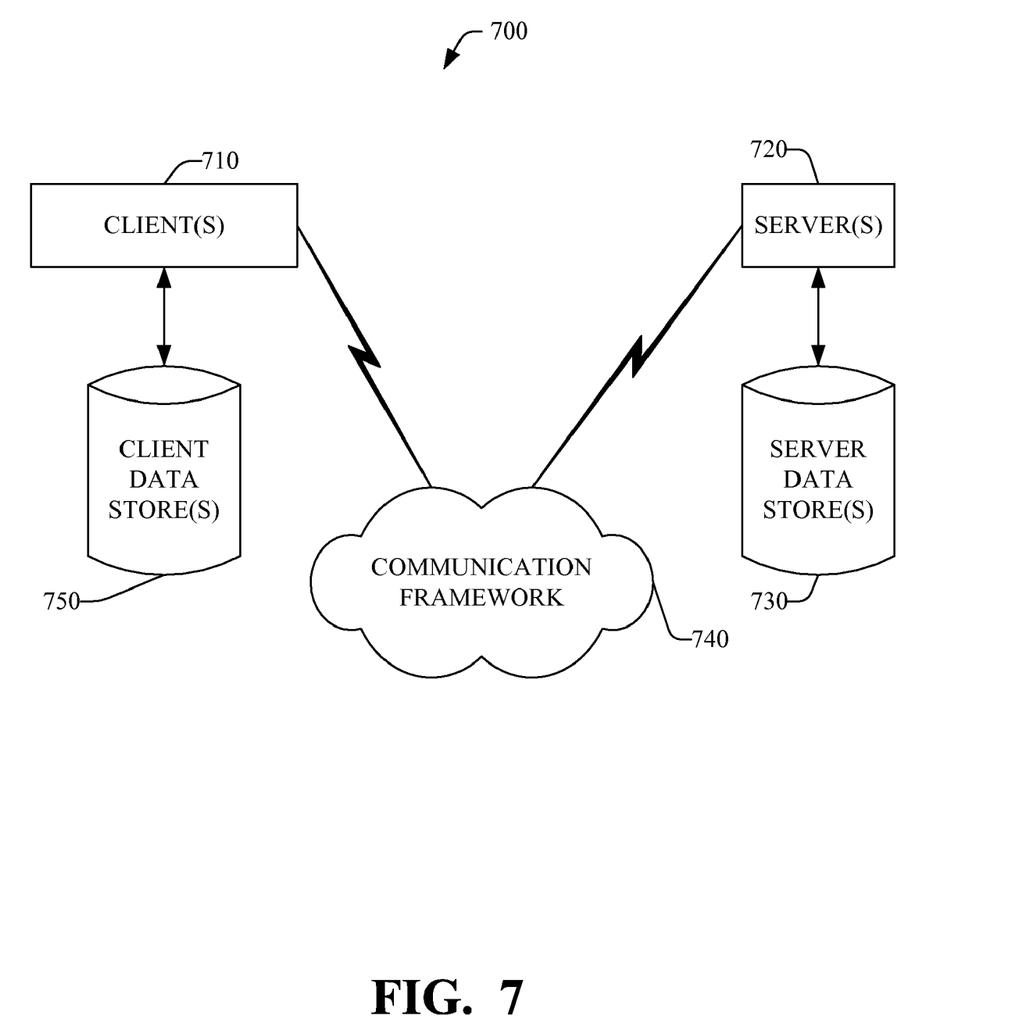
FIG. 7 is a schematic block diagram of a sample-computing environment.

In order to provide a context for the various aspects of the disclosed subject matter, FIGS. 6 and 7 as well as the following discussion are intended to provide a brief, general description of a suitable environment in which the various aspects of the disclosed subject matter may be implemented. While the subject matter has been described above in the general context of computer-executable instructions of a computer program that runs on a computer and/or computers, those skilled in the art will recognize that the subject innovation also may be implemented in combination with other program modules. Generally, program modules include routines, programs, components, data structures, etc. that perform particular tasks and/or implement particular abstract data types. Moreover, those skilled in the art will appreciate that the inventive methods may be practiced with other computer system configurations, including single-processor or multiprocessor computer systems, mini-computing devices, mainframe computers, as well as personal computers, handheld computing devices (e.g., personal digital assistant (PDA), phone, watch), microprocessor-based or programmable consumer or industrial electronics, and the like. The illustrated aspects may also be practiced in distributed computing environments where tasks are performed by remote processing devices that are linked through a communications network. However, some, if not all aspects of the claimed innovation can be practiced on stand-alone computers. In a distributed computing environment, program modules may be located in both local and remote memory storage devices.

With reference to FIG. 6, a suitable environment 600 for implementing various aspects of the claimed subject matter includes a computer 612. The computer 612 includes a processing unit 614, a system memory 616, and a system bus 618. The system bus 618 couples system components including, but not limited to, the system memory 616 to the processing unit 614. The processing unit 614 can be any of various available processors. Dual microprocessors and other multiprocessor architectures also can be employed as the processing unit 614.

The system bus 618 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Personal Computer Memory Card International Association bus (PCM-CIA), Firewire (IEEE 1394), and Small Computer Systems Interface (SCSI).

The system memory 616 includes volatile memory 620 and nonvolatile memory 622. The basic input/output system (BIOS), containing the basic routines to transfer information between elements within the computer 612, such as during start-up, is stored in nonvolatile memory 622. By way of illustration, and not limitation, nonvolatile memory 622 can include read only memory (ROM), programmable ROM (PROM), electrically programmable ROM (EPROM), electrically erasable programmable ROM (EEPROM), or flash memory. Volatile memory 620 includes random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), Rambus direct RAM (RDRAM), direct Rambus dynamic RAM (DRDRAM), and Rambus dynamic RAM (RDRAM).

Computer 612 also includes removable/non-removable, volatile/non-volatile computer storage media. FIG. 6 illustrates, for example, a disk storage 624. Disk storage 624 includes, but is not limited to, devices like a magnetic disk drive, floppy disk drive, tape drive, Jaz drive, Zip drive, LS-100 drive, flash memory card, or memory stick. In addition, disk storage 624 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 624 to the system bus 618, a removable or non-removable interface is typically used, such as interface 626.

It is to be appreciated that FIG. 6 describes software that acts as an intermediary between users and the basic computer resources described in the suitable operating environment 600. Such software includes an operating system 628. Operating system 628, which can be stored on disk storage 624, acts to control and allocate resources of the computer system 612. System applications 630 take advantage of the management of resources by operating system 628 through program modules 632 and program data 634 stored either in system memory 616 or on disk storage 624. It is to be appreciated that the claimed subject matter can be implemented with various operating systems or combinations of operating systems.

A user enters commands or information into the computer 612 through input device(s) 636. Input devices 636 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 614 through the system bus 618 via interface port(s) 638. Interface port(s) 638 include, for example, a serial port, a parallel port, a game port, and a universal serial bus (USB). Output device(s) 640 use some of the same type of ports as input device(s) 636. Thus, for example, a USB port may be used to provide input to computer 612, and to output information from computer 612 to an output device 640. Output adapter 642 is provided to illustrate that there are some output devices 640 like monitors, speakers, and printers, among other output devices 640, which require special adapters. The output adapters 642 include, by way of illustration and not limitation, video and sound cards that provide a means of connection between the output device 640 and the system bus 618. It should be noted that other devices and/or systems of devices provide both input and output capabilities such as remote computer(s) 644.

Computer 612 can operate in a networked environment using logical connections to one or more remote computers, such as remote computer(s) 644. The remote computer(s) 644 can be a personal computer, a server, a router, a network PC, a workstation, a microprocessor based appliance, a peer device or other common network node and the like, and typically includes many or all of the elements described relative to computer 612. For purposes of brevity, only a memory storage device 646 is illustrated with remote computer(s) 644.

Remote computer(s) 644 is logically connected to computer 612 through a network interface 648 and then physically connected via communication connection 650. Network interface 648 encompasses wire and/or wireless communication networks such as local-area networks (LAN) and wide-area networks (WAN). LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 650 refers to the hardware/software employed to connect the network interface 648 to the bus 618. While communication connection 650 is shown for illustrative clarity inside computer 612, it can also be external to computer 612. The hardware/software necessary for connection to the network interface 648 includes, for exemplary purposes only, internal and external technologies such as, modems including regular telephone grade modems, cable modems and DSL modems, ISDN adapters, and Ethernet cards.

FIG. 7 is a schematic block diagram of a sample-computing environment 700 with which the subject innovation can interact. The system 700 includes one or more client(s) 710. The client(s) 710 can be hardware and/or software (e.g., threads, processes, computing devices). The system 700 also includes one or more server(s) 730. Thus, system 700 can correspond to a two-tier client server model or a multi-tier model (e.g., client, middle tier server, data server), amongst other models. The server(s) 730 can also be hardware and/or software (e.g., threads, processes, computing devices). The servers 730 can house threads to perform transformations by employing the subject innovation, for example. One possible communication between a client 710 and a server 730 may be in the form of a data packet transmitted between two or more computer processes.

The system 700 includes a communication framework 750 that can be employed to facilitate communications between the client(s) 710 and the server(s) 730. The client(s) 710 are operatively connected to one or more client data store(s) 760 that can be employed to store information local to the client(s) 710. Similarly, the server(s) 730 are operatively connected to one or more server data store(s) 740 that can be employed to store information local to the servers 730.

What has been described above includes examples of aspects of the claimed subject matter. It is, of course, not possible to describe every conceivable combination of components or methodologies for purposes of describing the claimed subject matter, but one of ordinary skill in the art may recognize that many further combinations and permutations of the disclosed subject matter are possible. Accordingly, the disclosed subject matter is intended to embrace all such alterations, modifications and variations that fall within the spirit and scope of the appended claims. Furthermore, to the extent that the terms "includes," "has," or "having," or variations thereof, are used in either the detailed description or the claims, such terms are intended to be inclusive in a manner similar to the term "comprising" as "comprising" is interpreted when employed as a transitional word in a claim.

What is claimed is:

1. A system that facilitates sharing of a memory, comprising:

a host processor that performs at least one of a data read or data write by accessing the memory via an access channel and generates at least one of a read cycle or write cycle associated with at least one other processor when the host processor wants the at least one other processor to perform a function; and the at least one other processor that is implemented as a finite state machine and cannot access the memory via the access channel unless the at least one other processor receives the at least one of a read cycle or write cycle from the host processor.

2. The system of claim 1, the host processor executes in place and executes code directly from the memory.

3. The system of claim 1, the memory is at least one of volatile memory or non-volatile memory.

4. The system of claim 3, the non-volatile memory is flash memory.

5. The system of claim 1, the memory is partitioned so that a subset of memory addresses is accessed by the host processor and another subset of memory addresses is accessed by the other processor, wherein the partitioning of the memory is dynamic.

6. The system of claim 1, the at least one other processor performs at least one process associated with at least one of a digital signal process, a Fast Fourier Transform process, a Finite Impulse Response filter process, a cryptography process, an image process, or a data compression process.

7. The system of claim 1, the access channel is a bus, comprising control lines, memory address lines, and data lines.

8. A device that facilitates sharing of memory, comprising:

a host processor that retrieves data by accessing a memory via an access channel and generates a read cycle or write cycle associated with at least one other processor at a time when the host processor wants the at least one other processor to perform an operation; and the at least one other processor that is implemented as a finite state machine and cannot access the memory via the access channel unless the at least one other processor receives the read cycle or write cycle from the host processor.

9. The device of claim 8, the host processor executes in place and executes code directly from the memory.

10. The device of claim 8, the memory is at least one of volatile or non-volatile memory.

11. The device of claim 10, the non-volatile memory is flash memory.

12. The device of claim 8, the memory is partitioned so that a subset of one or more memory addresses in the memory is associated with the host processor and at least one other subset of one or more memory addresses is associated with the at least one other processor.

13. The device of claim 8, the at least one other processor is at least one of a digital signal processor, a Fast Fourier Transform processor, a Finite Impulse Response filter processor, a cryptography processor, an image processor, or a data compression processor.

14. A method for facilitating access to a memory, having a single access channel, shared by a host processor and at least one other processor, comprising:

generating at least one of a read or write associated with the host processor;

selecting a bypass mode to provide the host processor access to the memory via the single access channel; and retrieving data, associated with the at least one of a read, or write stored in the memory.

15. The method of claim 14, further comprising:

generating at least one of a read cycle or write cycle associated with the at least one other processor;

de-selecting the bypass mode to the provide the at least one other processor access to the memory via the single access channel;

writing data to the memory via the single access channel when a write cycle associated with the at least one other processor is generated; and reading data from the memory via the single access channel when a read cycle associated with the at least one other processor is generated.

16. The method of claim 15, further comprising:

transferring data from the memory to the at least one other processor when a read cycle associated with the at least one other processor is generated, or transferring data from the host processor to the at least one other processor when a write cycle associated with the at least one other processor is generated; and performing at least one process on the data transferred to the at least one other processor.

17. The method of claim 14, the host processor generates at least one of an instruction fetch cycle, a read cycle, or a write cycle.

18. The method of claim 14, the at least one other processor is at least one of a digital signal processor, a Fast Fourier Transform processor, a Finite Impulse Response filter processor, a cryptography processor, an image processor, or a data compression processor.

19. The method of claim 14, the at least one other processor is implemented as a finite state machine.

20. The method of claim 14, the memory is at least one of volatile or non-volatile memory.

* * * * *